(12) United States Patent
Katahira (10) Patent No.: US 8,797,566 B2
(45) Date of Patent: Aug. 5, 2014

(54) IMAGE PROCESSING APPARATUS, CONTROL METHOD AND STORAGE MEDIUM STORING PROGRAM

(75) Inventor: Yoshiaki Katahira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 13/489,558

(22) Filed: Jun. 6, 2012

(65) Prior Publication Data

US 2012/0327453 A1 Dec. 27, 2012

(30) Foreign Application Priority Data

Jun. 22, 2011 (JP) ................................. 2011-138891

(51) Int. Cl.
*G06F 15/00* (2006.01)
(52) U.S. Cl.
USPC ........................................................ 358/1.14
(58) Field of Classification Search
CPC .............................. G06F 3/1231; G06F 3/1238
USPC ........................................................ 358/1.14
See application file for complete search history.

(56) References Cited

U.S. PATENT DOCUMENTS

| 2007/0022467 A1 | 1/2007 | Filbrich |
| 2011/0188061 A1* | 8/2011 | Miyamoto ................... 358/1.12 |

FOREIGN PATENT DOCUMENTS

| EP | 1696311 A2 | 8/2006 |
| JP | 2006-236141 A | 9/2006 |
| JP | 2006-303805 A | 11/2006 |

OTHER PUBLICATIONS

European search report for counterpart European Application No. 12171577.5, dated Feb. 7, 2013.
Office Action issued on Mar. 13, 2014, in counterpart Korean Application No. 10-2012-0063587.

* cited by examiner

*Primary Examiner* — Saeid Ebrahimi Dehkordy
(74) *Attorney, Agent, or Firm* — Carter, DeLuca, Farrell & Schmidt, LLP

(57) ABSTRACT

This invention provides an image processing apparatus which can be connected to an information processing apparatus via a communication unit and a control method for the apparatus. The apparatus registers identification information of the information processing apparatus in association with authentication information for authenticating a user. The apparatus acquires, upon reception of a job from the information processing apparatus via the communication unit, the identification information of the information processing apparatus which has transmitted the job and determines whether or not the acquired identification information is registered. The apparatus authenticates the user by using the authentication information registered in association with the identification information when determining that the identification information is registered. The apparatus executes the job when the authentication succeeds.

7 Claims, 8 Drawing Sheets

| LOG-IN MANAGEMENT INFORMATION | | |
|---|---|---|
| 410 — LOG-IN NAME | AAA | BBB |
| 420 — PASSWORD | 1234 | 5678 |
| 430 — SCAN COUNT | 300 | 0 |
| 440 — SCAN COUNT LIMIT | 600 | 0 |
| 450 — COPY COUNT | 500 | 500 |
| 460 — COPY COUNT LIMIT | 1000 | 1000 |
| 470 — DESTINATION PC NAME | PC1 | PC2 |

IMAGE PROCESSING APPARATUS, CONTROL METHOD AND STORAGE MEDIUM STORING PROGRAM

BACKGROUND OF THE INVENTION

1. Field of the Invention

The present invention relates to an image processing apparatus connected to a plurality of information processing apparatuses via a network, a control method, and a storage medium storing the program.

2. Description of the Related Art

Recently, an increasing number of image processing apparatuses (for example, multi-function peripherals (MFPs)) in a log-in state use a pull scan function using a host PC and a driver, a pseudo push scan function, and a print function. The pseudo push scan function issues a request to "make the MFP execute pull scan" from the MFP to the "host PC" in which a pull scan driver is installed. With this function, the host PC makes the MFP execute scanning. Upon receiving a scanned image from the MFP in this manner, the host PC processes the image based on an image processing method designated at the time of pull scan, and stores the resultant data in a predetermined storage destination (Japanese Patent Laid-Open No. 2006-303805).

In such a case, however, when making the MFP perform pseudo push scan or pull scan upon user authentication, the user needs to set a document on the MFP upon performing "log-in" operation. This is a cumbersome operation, leading to poor usability. In addition, when performing pull scan, the user performs operation for changing the operation mode of the MFP to the remote scan mode, and then makes the PC execute pull scan. This leads to poor user-friendliness.

In order to avoid this, an MFP may be set to allow the execution of a job even if user information is unknown. In this case, however, it is impossible to update count information for each user or impose job restrictions on each user, leading to inconvenience.

SUMMARY OF THE INVENTION

An aspect of the present invention is to eliminate the above-mentioned problems with conventional technology.

The present invention provides an image processing apparatus which can execute a job from an information processing apparatus, upon receiving the job, by logging in to an image forming apparatus based on user information registered in association with the information processing apparatus, a control method and a storage medium storing the program.

The present invention in its first aspect provides an image processing apparatus capable of connecting to an information processing apparatus via a communication unit, the apparatus comprising: a registration unit configured to register identification information of the information processing apparatus in association with authentication information for authenticating a user; a determination unit configured to acquire, upon reception of a job from the information processing apparatus via the communication unit, the identification information of the information processing apparatus which has transmitted the job, and determine whether or not the acquired identification information is registered in the registration unit; an authentication unit configured to authenticate the user by using the authentication information registered in association with the identification information when the determination unit determines that the identification information is registered; and a job execution unit configured to execute the job when the authentication unit has succeeded authentication.

The present invention in its second aspect provides a control method of controlling an image processing apparatus capable of connecting to an information processing apparatus via a communication unit, the method comprising: a registration step of registering identification information of the information processing apparatus in association with authentication information for authenticating a user; a determination step of acquiring, upon reception of a job from the information processing apparatus via the communication unit, the identification information of the information processing apparatus which has transmitted the job and determining whether or not the acquired identification information is registered in the registration step; an authentication step of authenticating the user by using the authentication information registered in association with the identification information when it is determined in the determination step that the identification information is registered; and a job execution step of executing the job when the authentication step has succeeded authentication in the authentication step.

The present invention in its third aspect provides a computer-readable storage medium storing a program for causing a computer to execute a registration step of registering identification information of the information processing apparatus in association with authentication information for authenticating a user, a determination step of acquiring, upon reception of a job from the information processing apparatus via a communication unit, the identification information of the information processing apparatus which has transmitted the job and determining whether or not the acquired identification information is registered in the registration step, an authentication step of authenticating the user by using the authentication information registered in association with the identification information when it is determined in the determination step determines that the identification information is registered, and a job execution step of executing the job when the authentication has succeeded in the authentication step.

The present invention has an effect capable of executing a job from an information processing apparatus, upon receiving the job, by logging in to an image forming apparatus based on user information registered in association with the information processing apparatus.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same constituent elements, and a description of them will be omitted.

Figure 1:
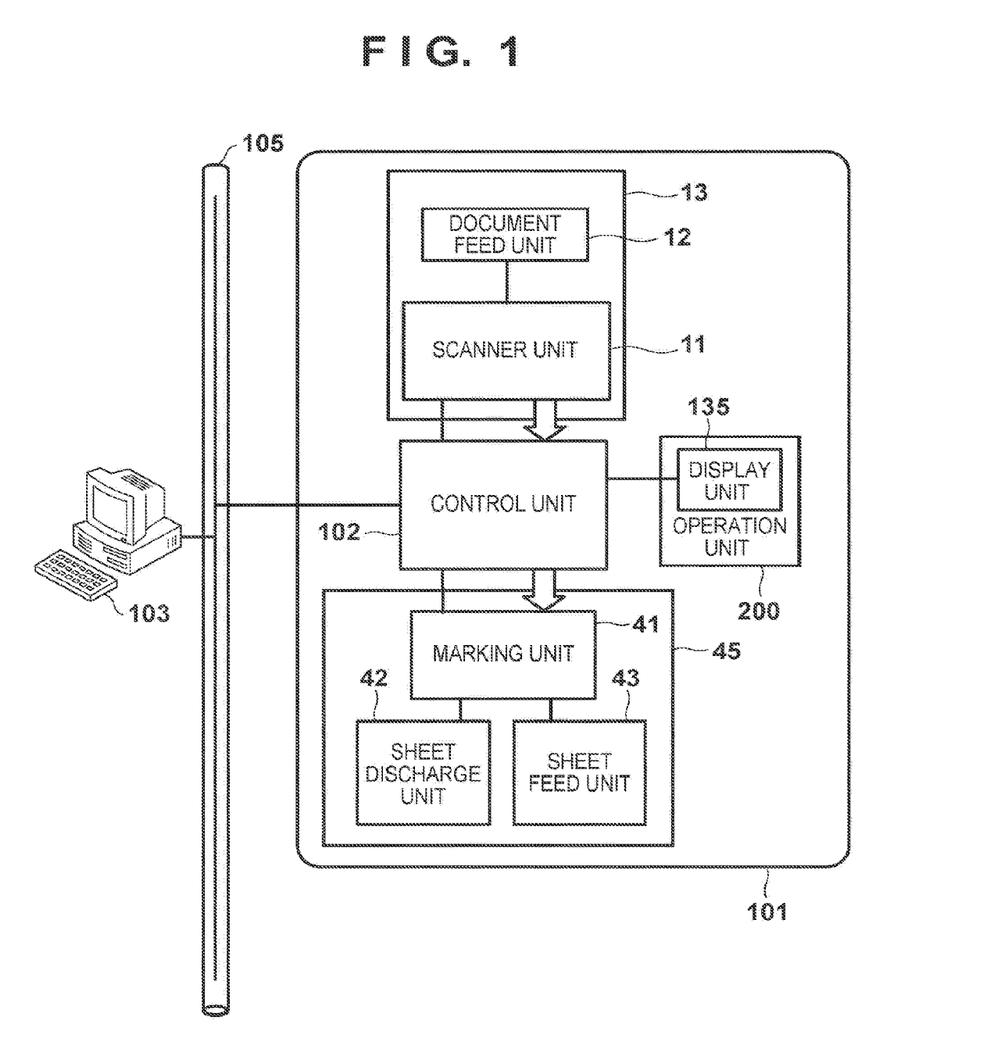
FIG. 1 is a block diagram showing the arrangement of a multi-function peripheral (MFP) according to this embodiment.

FIG. 1 is a block diagram showing the arrangement of an image processing apparatus (for example, MFP: multi-function peripheral) 101 according to this embodiment. The multi-function peripheral 101 is an example of an image forming apparatus, which can be connected to a PC via a network. This embodiment will be described below with reference to the multi-function peripheral 101.

The multi-function peripheral 101 includes a scanner function of reading a document and generating the image data of the document, a copy function of printing the read document image data, and a print function of printing based on print data from a PC or the like connected via a network.

A reader unit 13 optically reads a document image and converts it into image data. The reader unit 13 includes a scanner unit 11 having a function of reading a document and a document feed unit 12 having a function of conveying a document. A printer unit (image output unit) 45 conveys a printing sheet, prints a visible image on the sheet based on image data, and discharges it outside the apparatus. The printer unit 45 includes a sheet feed unit 43 having a plurality of types of printing sheet cassettes, a marking unit 41 having a function of transferring and fixing image data onto a printing sheet, and a sheet discharge unit 42 which sorts printed printing sheets, staples them, and discharges them outside the apparatus. A control unit 102 is electrically connected to the reader unit 13 and the printer unit 45 and is connected to an information processing apparatus (for example, a host PC to be referred to as a PC hereinafter) 103 via a network (for example, a LAN) 105.

The control unit 102 provides a copy function of controlling the reader unit 13 to read the image data of a document and controlling the printer unit 45 to print the image data on a sheet. The control unit 102 also provides a function of transmitting the image data input from the reader unit 13 to other information devices such as the PC 103 via the network 105. An operation unit 200 is connected to the control unit 102, includes a display unit 135 and a hardware key (to be described later), and provides a user interface for the operation of the multi-function peripheral 101.

Figure 2:
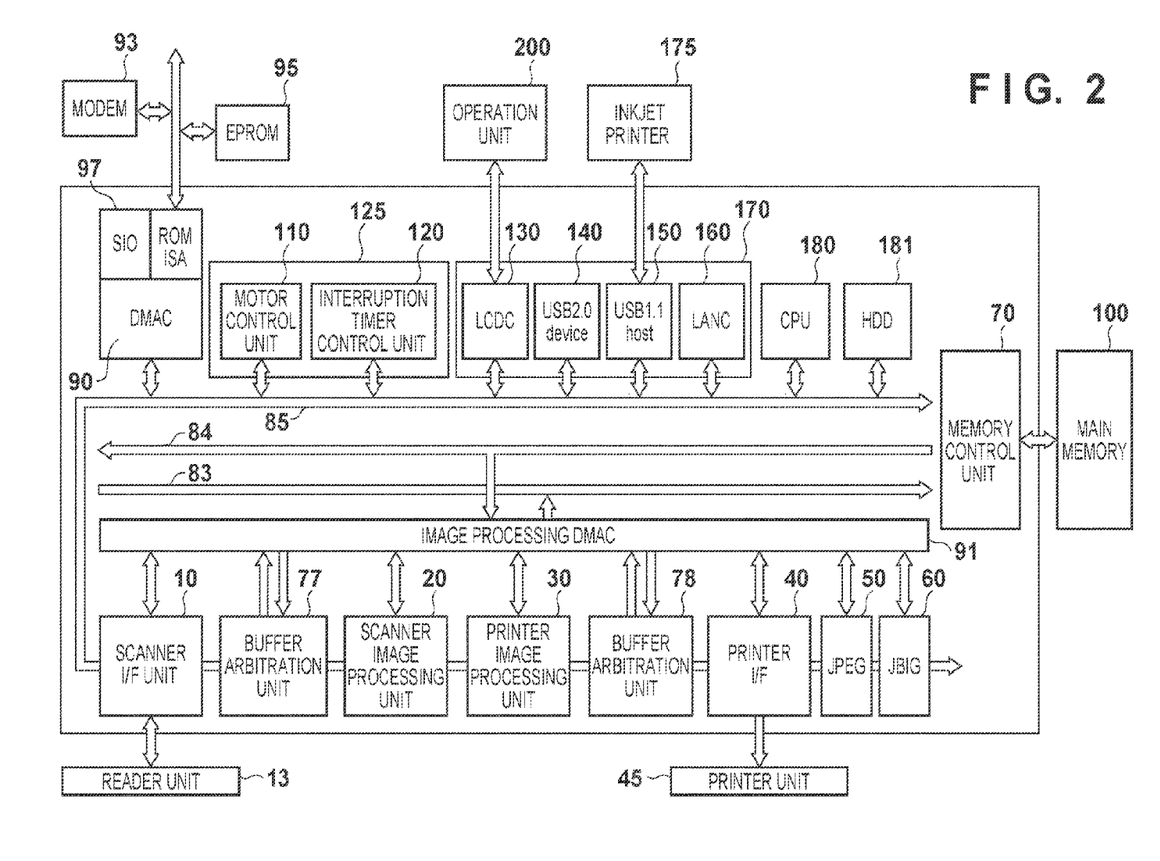
FIG. 2 is a block diagram showing the functional arrangement of the multi-function peripheral according to this embodiment.

FIG. 2 is a functional block diagram showing the functional arrangement of the multi-function peripheral 101 according to this embodiment.

A reader unit 13 is connected to a scanner interface (to be referred to as a scanner I/F unit hereinafter) 10. The scanner I/F unit 10 can capture read data from a CCD or CIS via the analog front end (AFE) of the reader unit 13. The scanner I/F unit 10 can input an output from a document sensor from the document feed unit 12 of the reader unit 13 to the multi-function peripheral 101. Data processing by the scanner I/F unit 10 will be described in detail later.

A scanner image processing unit 20 executes image processing corresponding to an image processing mode (a color copy mode, monochrome copy mode, color scan mode, monochrome scan mode, or the like) for the image data expanded in a main memory 100 via the scanner I/F unit 10. The scanner image processing unit 20 will be described in detail later. When exchanging data between the scanner I/F unit 10 and the scanner image processing unit 20 via a ring buffer area in the main memory 100, a buffer arbitration unit 77 arbitrates data write and read operations.

A printer image processing unit 30 performs region editing, resolution conversion, and the like for an input image and outputs the obtained image data to the printer unit 45. A printer interface 40 outputs processed image data to the printer unit 45 to which it is connected. A buffer arbitration unit 78 arbitrates data write and read operations when exchanging data between the printer image processing unit 30 and the printer I/F 40 via the ring buffer area in the main memory 100. JPEG and JBIG modules 50 and 60 execute compression and decompression processing of image data complying with predetermined standards.

A memory control unit 70 is connected to first and second buses 83 and 84 of an image processing system and a third bus 85 of a computer system and performs data transfer control for data write and read operations with respect to the main memory (SDRAM) 100.

A DMA controller (DMAC) 90 is connected to an EPROM 95 via a ROMISA 97 in cooperation with the memory control unit 70. The DMAC 90 generates and sets predetermined address information for DMA control with respect to data exchange between external devices, various types of interface units 170, and the main memory 100 in cooperation with a memory control unit 70. An image processing DMA controller (DMAC) 91 generates and sets predetermined address information for DMA control with respect to data exchange between the image processing units 20 and 30 and the main memory 100 in cooperation with the memory control unit 70. For example, the DMAC 91 generates address information for DMA transfer of the image data read and processed by the scanner I/F unit 10 to the main memory 100 for each DMA channel in accordance with the type of image reading device. Alternatively, the DMAC 91 generates address information for reading out image data expanded in the main memory 100 for each DMA channel. In this manner, the DMAC 91 functions as a unit which performs DMA control, together with the memory control unit 70, between the main memory 100 and the image processing units 20 and 30, for example, DMA transfer to the scanner image processing unit 20.

The EPROM 95 stores control parameters and control program data suitable for the image reading device (CCD or CIS) of the reader unit 13. In this manner, it is possible to set various kinds of control parameters in accordance with image reading devices, and hence it is possible to perform input processing of image data corresponding to data output formats unique to a CCD and CIS. This eliminates the necessity to provide dedicated interface circuits. A modem 93 performs conversion between digital data and audio data.

The first bus 83 sends the data read out from the main memory 100 to the respective processing units 10 to 60 of the image processing system. The second bus 84 sends the data read out from the respective processing units 10 to 60 of the image processing system to the main memory 100. The first and second buses 83 and 84 are paired to exchange image data between the image processing blocks and the main memory 100. The third bus 85 is a bus of the computer system, to which a CPU 180, the communication and user interface control units 170, a mechatronics system control unit 125, a control register, and the DMAC 90 are connected. The mechatronics system control unit 125 includes a motor control unit 110 and an interruption timer control unit 120 for controlling the driving timing of the motor and synchronization of processing in the image processing system. An LCD control unit (LCDC) 130 performs display control to display various settings, processing statuses, and the like on the display unit 135 of the operation unit 200. The LCDC 130 also has a function of transferring the information input by the user via an operation unit 300 to the CPU 180. An HDD 181 has an OS installed, together with programs executed by the CPU 180. At the time of execution of a program, the control program is expanded in the main memory 100 and executed under the control of the CPU 180.

USB interface units 140 and 150 allow connection of peripheral devices. FIG. 2 shows a state in which an inkjet printer 175 is connected to the USB interface unit 150. A network interface unit 160 controls the timing (access) of sending out data to a connected device. This unit is also used when communicating with another device (PC 103 or the like) via the LAN 105. The CPU 180 controls the overall operation of the multi-function peripheral 101.

The scanner I/F unit 10 is compatible as an image reading device with a CCD and CIS, and performs input processing of signals from both the image reading devices. In this case, the memory control unit 70 expands the input image data in the main memory 100 upon DMA transfer.

The scanner image processing unit 20 has various kinds of image conversion functions each of which is used to convert an image in the main memory 100 and write back data in the main memory 100. The scanner image processing unit 20 has a variable magnification function of converting the resolution of an image (for example, from 600 dpi to 200 dpi) and changing magnification (for example, from 25% to 400%). Before changing the magnification, the scanner image processing unit 20 rearranges a 32×32 pixel image into a 32-line unit image. The scanner image processing unit 20 has a color space conversion function of converting a multivalued input image, for example, a YUV image in the memory, into a Lab image by matrix computation and a lookup table (LUT) and storing the resultant image in the memory. In addition, this color space conversion function is configured to perform 3×8 matrix computation and have a one-dimensional LUT, and can perform known undercolor removal processing and obtain an anti-offset effect. A converted image is output as a multivalued image. The scanner image processing unit 20 has a binary/multivalued conversion function of converting a 1-bit binary image into a multivalued 8-bit, 256-tone image. In contrast to this, the scanner image processing unit 20 has a binary/multivalued conversion function of converting an 8-bit, 256-tone image in the memory into a 1-bit, 2-tone image by error diffusion processing or the like. The scanner image processing unit 20 has a thinning-out function capable of outputting ½, ¼, and ⅛ multivalued images by resolution conversion by thinning-out pixels from a multivalued image. It is possible to perform enlargement and reduction in wider ranges using this function in combination with the variable magnification function. The scanner image processing unit 20 can add or delete marginal portions to or from an input binary image or multivalued image and output the resultant image. The variable magnification function, color space conversion function, binary/multivalued conversion function, thinning-out function, and multivalued binary conversion function can operate in cooperation with each other.

Figure 3:
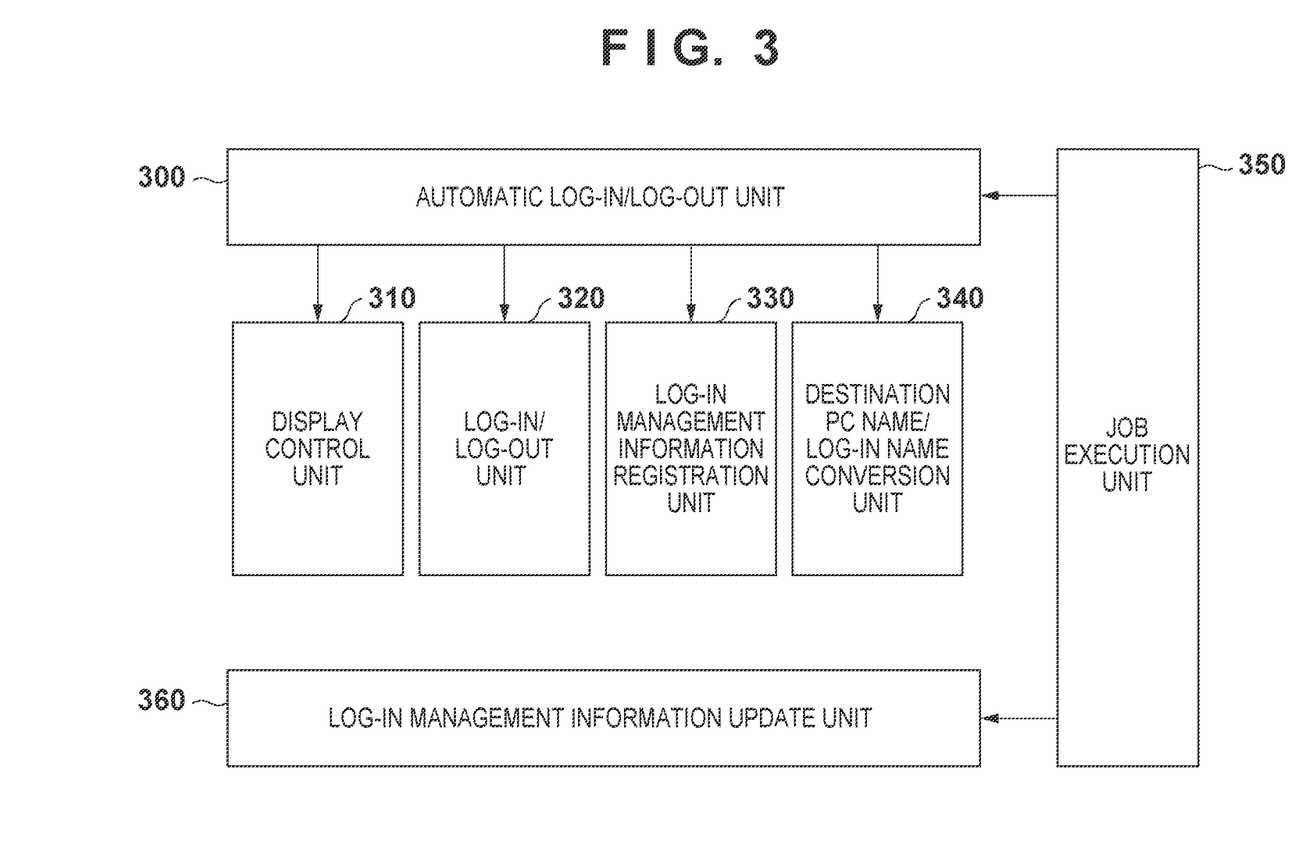
FIG. 3 is a view for explaining a functional arrangement for automatic log-in processing.

FIG. 3 is a functional block diagram for explaining automatic log-in processing in the multi-function peripheral 101 according to this embodiment.

The CPU 180 causes an automatic log-in/log-out unit 300 to automatically log-in or log-out by using a display control unit 310, a log-in/log-out unit 320, a log-in management information registration unit 330, and a destination PC name/log-in name conversion unit 340, which will be described in detail later. The CPU 180 causes a log-in management information update unit 360 to count the number of scans (the number of times of scanning) by a log-in user and the number of copies (the number of times of printing) on a page basis during the execution of jobs. The CPU 180 causes a job execution unit 350 to execute a job for which an execution request has been received via the USB interface unit 140 or the network interface unit 160 if it is possible to log in by using the automatic log-in/log-out unit 300. During the execution of a job, the log-in management information update unit 360 updates count information. In addition, when executing a job beyond the limit of the number of scans or the limit of the number of copies, the CPU 180 stops the job. Upon executing the job, the CPU 180 logs out by using the automatic log-in/log-out unit 300. If the CPU 180 cannot log in by using the automatic log-in/log-out unit 300, the CPU 180 does not execute any job.

The CPU 180 causes the display control unit 310 to perform display control on the display unit 135 of the operation unit 200 by using the LCDC 130. The CPU 180 causes the log-in/log-out unit 320 to set a log-in state which allows the use of the multi-function peripheral 101 upon authentication of log-in information input or transferred from the user to the multi-function peripheral 101. If the CPU 180 cannot authenticate a log-out state, that is, log-in information, it is possible to set a state in which the user cannot use the multi-function peripheral 101. As will be described later, the log-in management information registration unit 330 registers log-in management information. The CPU 180 causes the destination PC name/log-in name conversion unit 340 to acquire a destination PC name corresponding to a job for which the multi-function peripheral 101 has received an execution request and to search for a PC name matching a destination PC name in the log-in management information in FIG. 4. Upon finding a matched PC name, the destination PC name/log-in name conversion unit 340 acquires the corresponding log-in name and password. These pieces of information are an example of authentication information.

Figure 5:
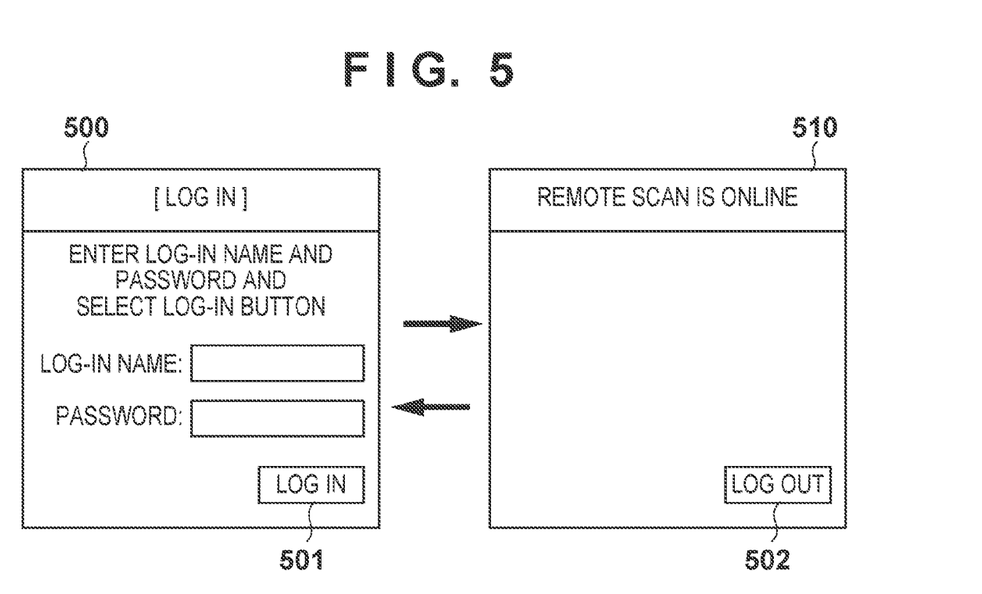
FIG. 5 is a view for explaining examples of log-in and log-out windows in the multi-function peripheral according to this embodiment.

FIG. 5 is a view for explaining examples of log-in and log-out windows in the multi-function peripheral 101.

Window 500 denotes an example of a window in a log-out state; and 510, an example of a window in a log-in state. When the user presses a log-in button 501 on the window 500 in the log-out state upon inputting a log-in name and a password, the user is authenticated. When the authentication succeeds, the user logs in. When the user presses a log-out button 502 on the window 510 in the log-in state, the user logs out.

Figure 4:
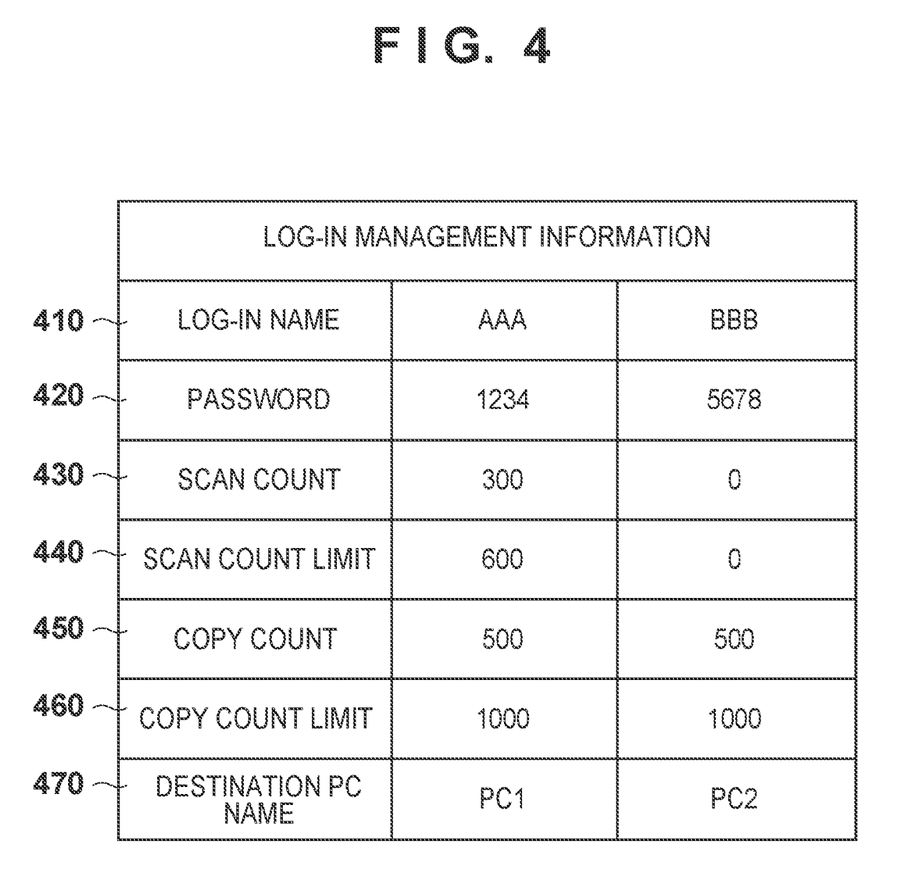
FIG. 4 is a view showing an example of log-in management information according to this embodiment.

FIG. 4 is a view showing an example of log-in management information.

This log-in management information is stored in the EPROM 95 and referred to by the CPU 180. The log-in management information has, as items, a log-in name 410, a password 420, a scan count 430, a scan count limit 440, a copy count 450, a copy count limit 460, and a destination PC name 470. A set of these items is stored for each log-in management to be performed.

The CPU 180 refers to the log-in name 410 and the password 420 to perform authentication with respect to log-in information for a job which is input or entered by the user to the multi-function peripheral 101. If they match each other, the CPU 180 sets a log-in state in which the user can use the multi-function peripheral 101.

The EPROM 95 stores, as the scan count 430, the number of pages on which the log-in user has executed scanning. The CPU 180 counts up the scan count 430 every time one page is scanned. The scan count limit 440 indicates the scan count limit set for the log-in user. The CPU 180 inhibits the user from executing scanning beyond the limit value. The EPROM 95 stores, as the copy count 450, the number of pages on which the log-in user has executed printing. The CPU 180 counts up the copy count 450 every time printing is performed on one page. The EPROM 95 stores, as the copy count limit 460, a copy count limit for the log-in user. The CPU 180 inhibits the user from executing printing beyond the limit value. The CPU 180 causes the log-in management information registration unit 330 (to be described later) to store the destination PC name 470 in association with a log-in name and a password.

Figure 6:
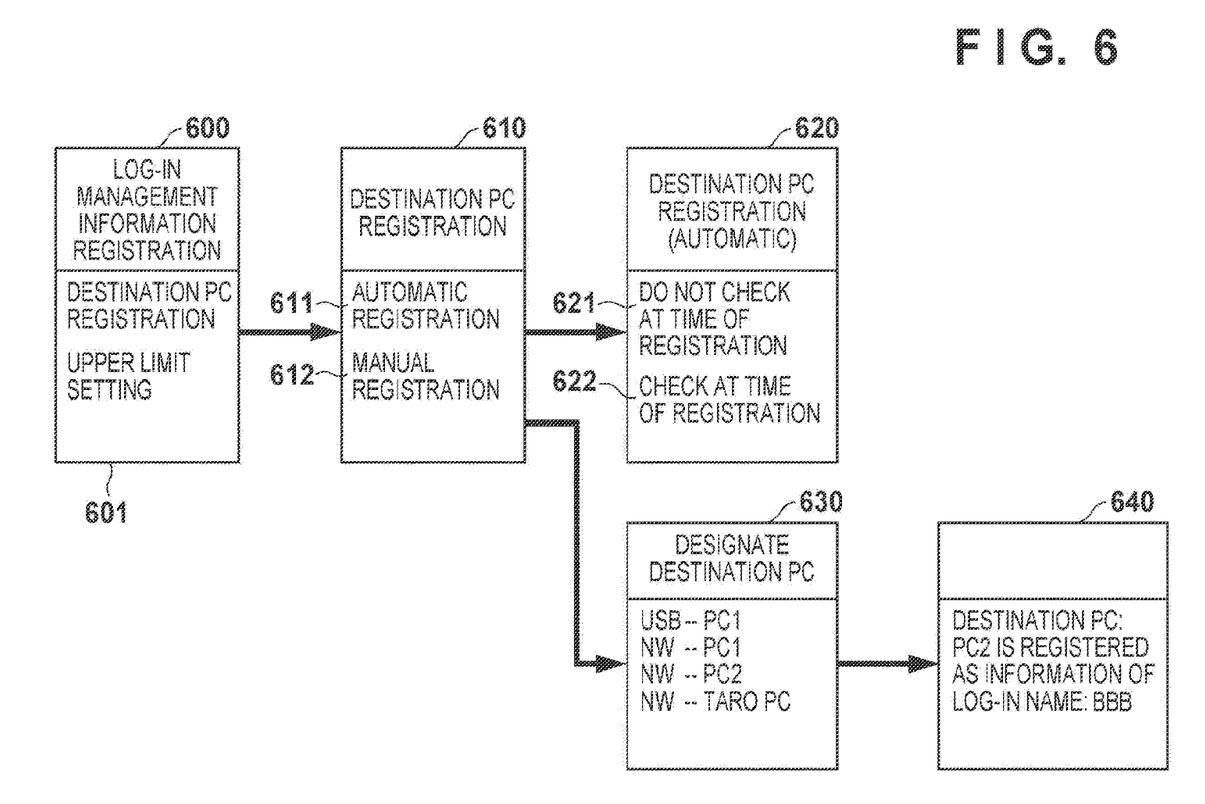
FIG. 6 is a view for explaining window transition when a log-in management information registration unit according to the embodiment registers log-in management information.

The log-in management information registration unit 330 performs registration in accordance with a window procedure like that shown in FIG. 6.

FIG. 6 is a view for explaining window transition when the log-in management information registration unit 330 according to the embodiment registers log-in management information.

Referring to FIG. 6, Window 600 denotes a registration window for log-in management information. Upon recognizing that the user has selected destination PC registration 601, the CPU 180 displays a destination PC registration window 610. On the destination PC registration window 610, the CPU 180 displays a choice between automatic registration 611 of automatically registering a destination PC and manual registration 612 of manually registering a destination PC.

When the user selects automatic registration 611, the CPU 180 displays a destination PC registration (automatic) window 620 on the display unit 135. The window 620 displays a choice between "do not check at time of registration" 621 and "check at time of registration" 622. Upon recognizing that the user has selected "do not check at time of registration" 621 on the window 620, the CPU 180 stores, in the EPROM 95, information indicating that the CPU 180 does not check the user when automatically registering a destination PC according to the procedure to be described later. In contrast, upon recognizing that the user has selected "check at time of registration" 622, the CPU 180 stores, in the EPROM 95, information indicating that the CPU 180 checks the user when automatically registering a destination PC according to the procedure to be described later.

The CPU 180 displays a destination PC designation window 630 when recognizing that the user has selected manual registration 612 on the destination PC registration window 610. The CPU 180 acquires the names of PCs connected to the USB interface unit 140 or the network interface unit 160 and displays them as choices. When the CPU 180 recognizes that a destination PC is designated on the destination PC designation window 630, a registration completion message window 640 indicates that the designated destination PC is stored as the destination PC name 470 of the log-in management information. This information is stored in the EPROM 95. That is, as shown in FIG. 4, "PC2" is registered as a destination PC of the user, whose log-in name is "BBB" from the list of PC names on the destination PC designation window 630.

<Explanation of Scanned Image Storage Processing>

The scanned image received via the scanner I/F unit 10 is temporarily stored in the input buffer. At this time, when the image data is monochrome data, one byte is processed per pixel. When the image data is color data, 3-byte multivalued data is processed per pixel. In this case, the input buffer need not store data corresponding to one page altogether, and may store an amount of data corresponding to each processing performed next by the scanner image processing unit 20. Upon performing binarization or image rotation, the scanner image processing unit 20 performs encode processing by JBIG 60 when the image data is monochrome data, and by JPEG 50 when the image data is color data. The resultant data is stored in the main memory 100.

In this embodiment, when performing pull scan and pseudo push scan, since the PC 103 is in charge of performing most of image processing, the scanner image processing unit 20 does not perform image rotation or image encode processing, and stores the scanned image in the main memory 100 without any change. Note that the scanned image may be stored in the HDD 181 or the like depending on the hardware arrangement.

An image data transmission function will be described next.

The CPU 180 executes a control program expanded in the main memory 100 to implement a protocol and transmission specifications. More specifically, the CPU 180 performs encoding, addition of a packet header, and the like for image data stored in the main memory 100, and transmits the resultant image data to an information device, for example, the PC 103 on the network via the third bus 85 and the LANC 160. Note that as this control program, a program installed in the HDD 181 may be expanded in the main memory 100, and the CPU 180 may execute the control program.

<Destination PC Registration Procedure>

Figure 7:
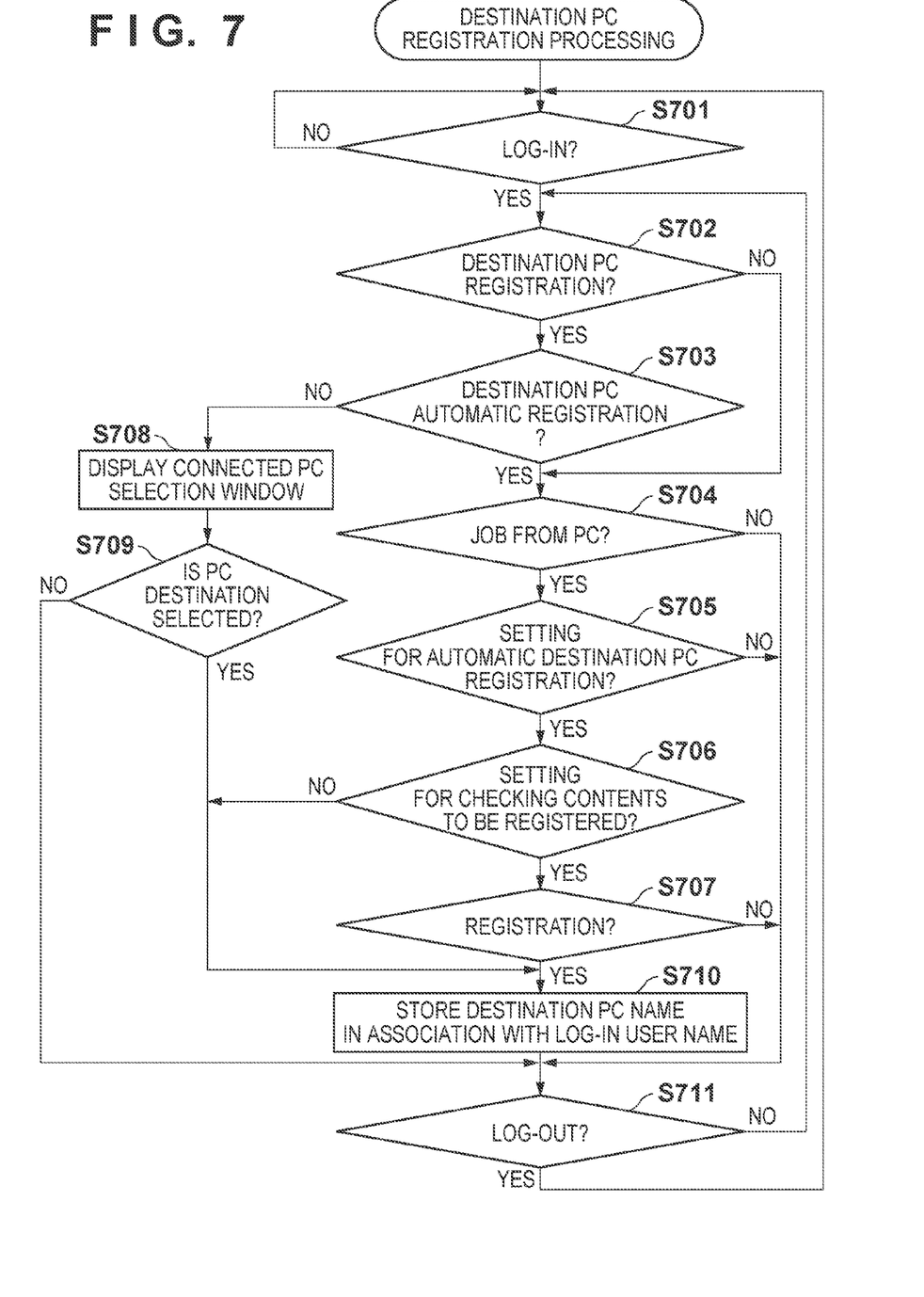
FIG. 7 is a flowchart showing a procedure for destination PC registration processing in the multi-function peripheral according to this embodiment.

FIG. 7 is a flowchart showing a procedure for destination PC registration processing in the multi-function peripheral 101 according to this embodiment. A program for the execution of this processing is expanded from the HDD 181 into the main memory 100 and executed under the control of the CPU 180.

First of all, in step 8701, the CPU 180 determines whether the user has executed log-in operation with the operation unit 200 and has been authenticated as a result of the log-in operation. If YES in step 8701, the process advances to step 8702. If the user has not executed log-in operation or has not been authenticated after the execution of log-in operation, the CPU 180 performs the processing in step 8701. In step 8702, the CPU 180 determines whether the log-in user has operated the operation unit 200 to select destination PC name registration processing. If the user has selected PC registration processing, the CPU 180 causes the display control unit 310 to display the destination PC registration window 610, and performs the processing in step 8703. If the user has not selected destination PC name registration processing, the process advances to step 8704. Referring to the case shown in FIG. 6, if the user has selected destination PC registration 601 on the log-in management information registration window 600, the CPU 180 displays the destination PC registration window 610 in step 8703.

In step S703, the CPU 180 determines which one of automatic registration and manual registration the user has selected on the destination PC registration window 610. If the user has selected automatic registration, the display control unit 310 displays the checking/setting window 620 at the time of automatic destination PC registration, and displays the choices 621 and 622 between checking the contents to be registered and not checking them at the time of automatic registration. Upon recognizing the selection by the user, the CPU 180 stores the set contents in the EPROM 95. The process then advances to step S704. If the user has selected manual registration on the destination PC registration window 610, the process advances to step S708 to cause the display control unit 310 to display the destination PC designation window 630.

Referring to FIG. 6, if the user has selected automatic registration 611 on the destination PC registration window 610, the CPU 180 displays the destination PC registration (automatic) window 620. In this case, the CPU 180 displays a choice between "do not check at time of registration" 621 and "check at time of registration" 622. If the user has selected manual registration 612 on the destination PC registration window 610, the CPU 180 displays the destination PC designation window 630.

The process then advances to step S709, the CPU 180 determines whether the user has selected a PC from the PC choices displayed in step S708. Upon recognition of selection, the CPU 180 acquires the selected PC name. The process then advances to step S710 to register the selected PC name in association with the log-in user name. In contrast, upon recognition of cancellation of selection by the user in step S709, the CPU 180 performs the processing in step S711.

If the user has selected automatic registration in step S704, the CPU 180 determines whether it has received a job from the PC 103 via the USB interface unit 140 or the network interface unit 160. Note that the reception of a pseudo push scan job is also determined as the reception of a job from the PC 103. If the CPU 180 determines that it has received a job from the PC 103, the process advances to step S705. If the CPU 180 determines that it has received no job from the PC 103, the process advances to step S711. In step S705, the CPU 180 refers to the EPROM 95 to determine whether destination PC registration set in step S703 is automatic registration setting or manual registration setting. If the CPU 180 determines automatic registration setting, the process advances to step S706 to acquire the PC name in the job received from the PC. If the CPU 180 determines manual registration setting, the process advances to step S711. The process then advances to step S706, in which the CPU 180 refers to the EPROM 95. If the setting in step S703 is "check the contents to be registered at the time of automatic registration", the process advances to step S707. If the setting in step S703 is "do not check the contents to be registered at the time of automatic registration", the process advances to step S710. In step S707, the CPU 180 causes the display control unit 310 to display destination PC registration contents (the log-in name and the PC name acquired in step S705) and a choice between registering and not registering. If the CPU 180 recognizes that the user has selected "registering", the process advances to step S710, in which the CPU 180 stores the PC name acquired in step S706 in association with the log-in name and password of the log-in management information stored in the EPROM 95 which correspond to the user who is currently logging in. The process then advances to step S711. Referring to FIG. 4, the CPU 180 stores the PC name in the log-in management information as a destination PC name 470 of the log-in user. Note that if the CPU 180 recognizes in step S707 that the user has selected "not registering", the process advances to step S711.

In step S711, the CPU 180 determines whether the user has logged out. If the user has logged out, the process advances to step S701. If the user has not logged out, the process advances to step S702.

In this manner, the log-in user can manually or automatically register a destination PC name as log-in management information in association with the user name of the log-in user.

Figure 8:
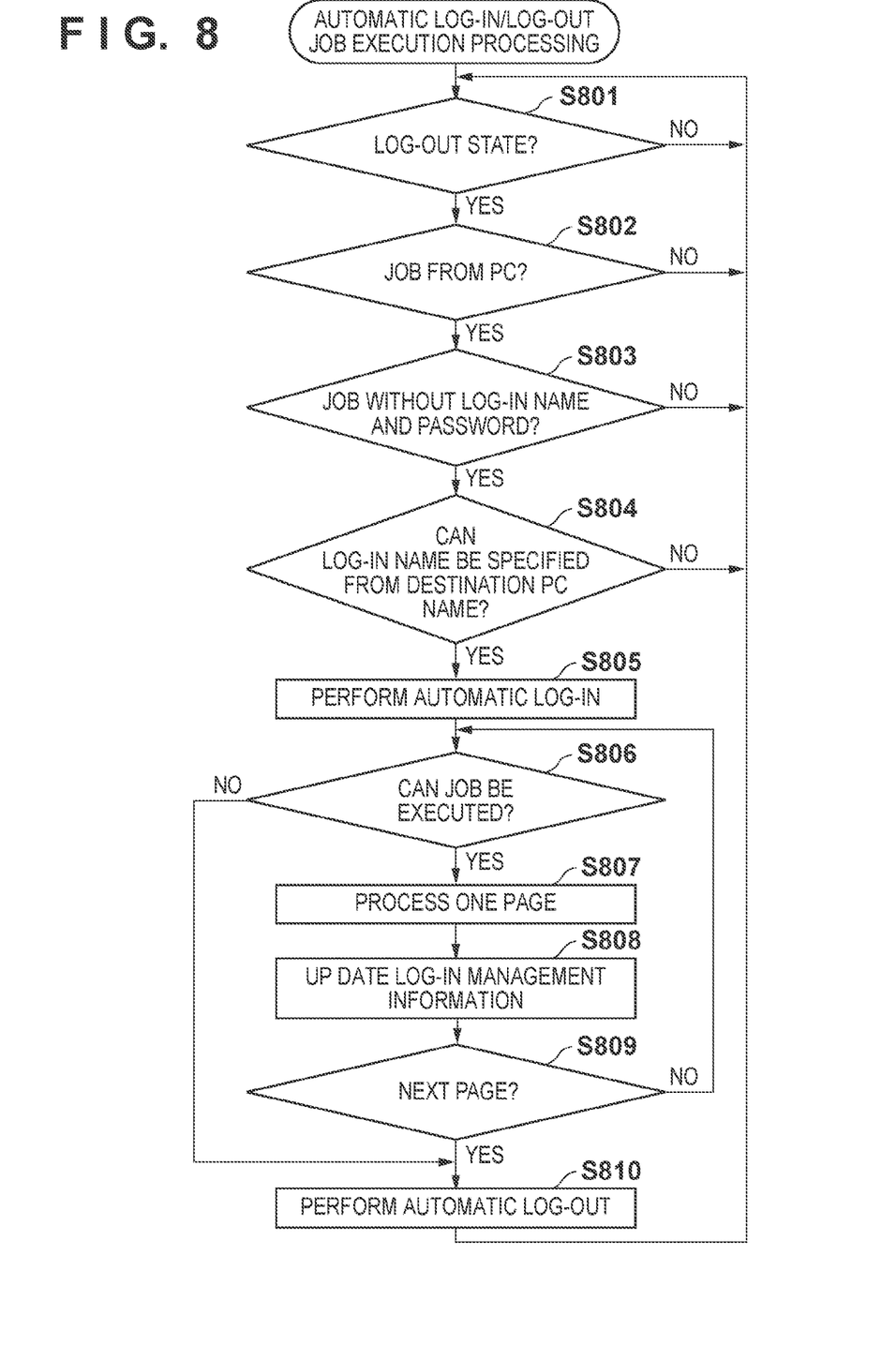
FIG. 8 is a flowchart for explaining a job execution processing procedure for automatic log-in/log-out processing in the multi-function peripheral according to this embodiment.

FIG. 8 is a flowchart for explaining a job execution processing procedure for automatic log-in/log-out processing in the multi-function peripheral 101 according to this embodiment. A program for the execution of this processing is expanded from the HDD 181 into the main memory 100 and executed under the control of the CPU 180.

First of all, the CPU 180 determines in step S801 whether the multi-function peripheral 101 is in the log-out state. If the multi-function peripheral 101 is in the log-out state, the process advances to step S802. If the multi-function peripheral 101 is not in the log-out state (log-in), the process advances to step S801. In step S802, the CPU 180 determines whether it has received a job from the PC 103 via the USB interface unit 140 or the network interface unit 160. This job is, for example, a pull scan job or a print job. Pseudo pull scan job is also determined as a job from the PC. If the CPU 180 determines that it has received a job from the PC, the process advances to step S803. If the CPU 180 determines that it has received no job from the PC 103, the process advances to step S801. In step S803, the CPU 180 determines whether the job received in step S802 notifies it of a log-in name and a password. If the CPU 180 determines that the job notifies it of a log-in name and a password, the process advances to step S801 to execute the job in a process operated in parallel to this processing.

If the CPU 180 determines in step S803 that the job does not notify it of a log-in name and a password, the process advances to step S804. In this case, the CPU 180 acquires the PC name in the job received from the PC 103, and causes the destination PC name/log-in name conversion unit 340 to determine from the log-in management information in FIG. 4 whether there are a corresponding log-in name and password. If the corresponding log-in name and password are registered in the log-in management information, the process advances to step S805. If the corresponding log-in name and password are not registered in the log-in management information, the process advances to the processing in step S801, in which the CPU 180 does not perform log-in processing. In the case shown in FIG. 4, if, for example, the PC name (PC identification information) is "PC2", the log-in name "BBB" and the password "5678" are registered in correspondence with "PC2".

In step S805, the CPU 180 causes the log-in/log-out unit 320 to perform log-in authentication by using the corresponding log-in name and password determined by the destination PC name/log-in name conversion unit 340 in step S804. After this log-in authentication, the CPU 180 causes the display control unit 310 to display a received job execution window, and performs the processing in step S806. In step S806, the CPU 180 acquires counts (the scan count 430 and the copy count 450) and counter limit information (the scan count limit 440 and the copy count limit 460) of the log-in user from the log-in management information. When the received job is processed by one page, the CPU 180 determines whether the current count exceeds the count limit. If the current count does not exceed the count limit, since it is possible to process one page, the process advances to step S807. If the current count exceeds the count limit, the process advances to step S810 to stop the job and execute automatic log-out operation.

In step S807, the CPU 180 processes the received job for one page, and the process advances to step S808. In step S808, the CPU 180 counts up the scan count 430 and/or the copy count 450 of the log-in user in the log-in management information with respect to one page of the job executed in step S807. The process then advances to step S809. In this case, for example, in the execution of a copy job, the CPU 180 counts up the scan count 430 and the copy count 450. In the execution of a print job, the CPU 180 counts up only the copy count 450. In step S809, the CPU 180 determines whether there is any page for which the processing should be executed. If there is such a page, the CPU 180 performs the processing in step S806. If there is no page for which the processing should be executed, the CPU 180 finishes the job and performs the processing in step S810. In step S810, the CPU 180 causes the log-in/log-out unit 320 to set the multi-function peripheral 101 in the log-out state. The process then advances to step S801.

As has been described above, upon receiving a job from a PC in the log-out state, the CPU acquires a PC name in a received job and determines whether a log-in name and password corresponding to the PC name are registered in log-in management information. If a corresponding log-in name and password are registered, the CPU performs log-in authentication for the user who is to execute the job from the PC, and can execute the job upon automatically executing log-in processing. In addition, the CPU can perform control to allow the authenticated user to execute a job within the ranges of scan count limit and copy count limit set for the user.

Although this embodiment uses the network (TCP/IP) and USB as a communication configuration, it is obviously possible to apply similar processing to any type of communication configuration.

In this embodiment, the window contents shown in FIGS. 5 and 6 displayed on the display unit 135 of the multi-function peripheral 101 each are merely an example, and it is obviously possible to apply the present invention to other expressions.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-138891, filed Jun. 22, 2011, which is hereby incorporated by reference herein in its entirety.

What is claimed is:

1. An image processing apparatus capable of connecting to an information processing apparatus via a communication unit, the apparatus comprising:
    a registration unit configured to register identification information of the information processing apparatus in association with authentication information for authenticating a user;
    a determination unit configured to acquire, upon reception of a job from the information processing apparatus via the communication unit, the identification information of the information processing apparatus which has transmitted the job, and determine whether or not the acquired identification information is registered in the registration unit;
    a log-in control unit configured to shift the image processing apparatus into a log-in state in which the user can use the image processing apparatus by authenticating the user with the authentication information registered in association with the identification information, in a case where the determination unit determines that the identification information is registered; and
    a job execution unit configured to execute the job in a case where the log-in control unit shifts the image processing apparatus into the log-in state.

2. The apparatus according to claim 1, wherein the registration unit registers the identification information of the information processing apparatus by displaying a list of a plurality of information processing apparatuses and allowing the user to select and register one of the plurality of information processing apparatuses from the list or by using the identification information which is included in the job received from the information processing apparatus.

3. The apparatus according to claim 1, further comprising a generation unit configured to generate log-in management information by associating the identification information of the information processing apparatus with the authentication information for authenticating the user,
    wherein the registration unit registers the log-in management information generated by the generation unit,
    wherein the log-in management information includes limit information which limits a number of times of execution of a job in association with the authentication information, and
    wherein the job execution unit executes the job within the limit information.

4. The apparatus according to claim 3, wherein in the log-in management information, the number of times of execution of the job is stored in association with the authentication information of the user, and the job execution unit updates the number of times of execution of the job in a case where the job is executed.

5. The apparatus according to claim 1, further comprising a log-out control unit configured to shift the image processing apparatus into a log-out state in which the user cannot use the image processing apparatus in a case where the job execution unit completes executing the job.

6. A control method of controlling an image processing apparatus capable of connecting to an information processing apparatus via a communication unit, the method comprising:
    registering identification information of the information processing apparatus in association with authentication information for authenticating a user;
    acquiring, upon reception of a job from the information processing apparatus via the communication unit, the identification information of the information processing apparatus which has transmitted the job and determining whether or not the acquired identification information is registered;
    shifting the image processing apparatus into a log-in state in which the user can use the image processing apparatus by authenticating the user with the authentication information registered in association with the identification information, in a case where it is determined that the identification information is registered; and
    executing the job in a case where the image processing apparatus is shifted into the log-in state.

7. A non-transitory computer-readable storage medium storing a program for causing a computer to execute a control method of controlling an image processing apparatus capable of connecting to an information processing apparatus via a communication unit, the method comprising:

registering identification information of the information processing apparatus in association with authentication information for authenticating a user;

acquiring, upon reception of a job from the information processing apparatus via the communication unit, the identification information of the information processing apparatus which has transmitted the job and determining whether or not the acquired identification information is registered;

shifting the image processing apparatus into a log-in state in which the user can use the image processing apparatus by authenticating the user with the authentication information registered in association with the identification information, in a case where it is determined that the identification information is registered; and executing the job in a case where the image processing apparatus is shifted into the log-in state.

* * * * *